(12) United States Patent
Persent et al.

(10) Patent No.: US 10,815,738 B2
(45) Date of Patent: Oct. 27, 2020

(54) METHOD FOR UPGRADING A CONNECTOR ASSEMBLING TWO RISER PIPE SECTIONS BY MEANS OF A DISMOUNTABLE LOCKING COLLAR

(71) Applicant: IFP Energies nouvelles, Rueil-Malmaison (FR)

(72) Inventors: Emmanuel Persent, Croissy sur Seine (FR); Eleonore Roguet, Rueil-Malmaison (FR); Jeremie Triadou, Carrieres sous Poissy (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 409 days.

(21) Appl. No.: 15/912,092

(22) Filed: Mar. 5, 2018

(65) Prior Publication Data

US 2018/0252055 A1   Sep. 6, 2018

(30) Foreign Application Priority Data

Mar. 3, 2017   (FR) .................................... 17 51735

(51) Int. Cl.
| | | |
|---|---|---|
| *E21B 17/08* | (2006.01) | |
| *E21B 17/043* | (2006.01) | |
| *E21B 17/046* | (2006.01) | |
| *F16L 37/107* | (2006.01) | |
| *F16L 21/08* | (2006.01) | |

(52) U.S. Cl.
CPC .......... *E21B 17/085* (2013.01); *E21B 17/043* (2013.01); *E21B 17/046* (2013.01); *F16L 37/107* (2013.01); *F16L 21/08* (2013.01)

(58) Field of Classification Search
CPC .... E21B 17/085; E21B 17/043; E21B 17/046; F16L 37/107; F16L 21/08
See application file for complete search history.

(56) References Cited

U.S. PATENT DOCUMENTS

| | | | |
|---|---|---|---|
| 10,641,047 B2* | 5/2020 | Persent | ................... F16L 13/02 |
| 10,648,244 B2* | 5/2020 | Persent | ................ F16L 37/113 |
| 2005/0206163 A1 | 9/2005 | Guesnon et al. | |
| 2010/0319925 A1 | 12/2010 | Papon et al. | |
| 2011/0203804 A1 | 8/2011 | Guesnon et al. | |
| 2013/0020087 A1 | 1/2013 | Guesnon et al. | |
| 2017/0074052 A1 | 3/2017 | Persent et al. | |
| 2017/0074053 A1 | 3/2017 | Persent et al. | |

FOREIGN PATENT DOCUMENTS

| | | |
|---|---|---|
| CN | 102168529 A | 8/2011 |
| FR | 2866942 A1 | 9/2005 |
| FR | 2956693 A1 | 8/2011 |
| FR | 2956694 A1 | 8/2011 |
| FR | 3020654 A1 | 11/2015 |

(Continued)

OTHER PUBLICATIONS

Preliminary Search Report dated Oct. 27, 2017 (2 Pages).

*Primary Examiner* — John C Hong
(74) *Attorney, Agent, or Firm* — Fitch, Even, Tabin & Flannery LLP (57) ABSTRACT

The present invention relates to a method for upgrading a connector of an existing riser pipe by cutting out male connector element (9) or locking collar (11), then by replacing locking collar (11) with a dismountable replacement locking collar (11').

14 Claims, 5 Drawing Sheets

(56) References Cited

FOREIGN PATENT DOCUMENTS

| | | | |
|---|---|---|---|
| FR | 3020655 | A1 | 11/2015 |
| WO | 2009/140027 | A1 | 11/2009 |
| WO | 2010/069863 | A1 | 6/2010 |
| WO | 2015/071411 | A2 | 5/2015 |
| WO | 2015/169559 | A1 | 11/2015 |
| WO | 2015/169560 | A1 | 11/2015 |

\* cited by examiner

METHOD FOR UPGRADING A CONNECTOR ASSEMBLING TWO RISER PIPE SECTIONS BY MEANS OF A DISMOUNTABLE LOCKING COLLAR

CROSS-REFERENCE TO RELATED APPLICATIONS

Reference is made to French patent application 17/51.735, filed Mar. 3, 2017 which is hereby incorporated herein by reference in its entirety for all purposes.

FIELD OF THE INVENTION

The present invention relates to the field of very deep sea oil reservoir drilling and development. It concerns a method of modifying a riser pipe connector.

A drilling riser is made up of an assembly of tubular elements of length ranging between 15 and 27 m (50 and 90 feet), assembled by connectors. The tubular elements generally consist of a main tube provided with connectors at each end. Tubular auxiliary lines, also called peripheral lines, commonly referred to as "kill line", "choke line", "booster line" and "hydraulic line", allowing circulation of technical fluids, are provided parallel to the main tube. The tubular elements are assembled on the drilling site, from a floater. The riser is lowered into the water depth as the tubular elements are assembled, until it reaches the wellhead located on the sea bottom.

In the perspective of drilling at water depths that can reach 3500 m or more, the weight of the riser becomes very penalizing. This phenomenon is increased by the fact that, for the same maximum working pressure, the length of the riser requires a larger inside diameter for the auxiliary lines, considering the necessity to limit pressure drops.

Besides, the necessity to decrease the riser assembly time is all the more critical since the water depth, and therefore the riser length, is great.

BACKGROUND OF THE INVENTION

Connectors referred to as "quick" connectors have been developed to meet these needs.

Conventionally, a "quick" connector is made up of a male connector element, a female connector element and a locking collar. The male connector element fits into the female connector element so as to connect the two sections and the locking collar provides locking of the assembly. A widely used design of such a connector is a connector where the locking collar is external: in other words, outside the male and female connector elements. On one side, the collar is mounted on the male connector element while being retained by a shoulder, and on the other side the collar forms with the female connector element a "bayonet" assembly that can be disconnected. Patent application FR-2,866,942 (US-2005/206,163) describes an example of a connector for assembling two riser sections, with an external locking collar. However, due to the shoulder retaining the locking collar relative to the male connector element, the locking collar commonly used is not dismountable. It is therefore not possible to thoroughly inspect the entire locking collar. Furthermore, because the locking collar is not dismountable, specific material (light and mirrors) has to be used to inspect the most sensitive areas.

Other "quick" connector designs are described in patent applications FR-2,925,105 (US-2010/319,925), FR-2,956,693 (US-2011/203,804) and FR-2,956,694 (US-2013/020,087). However, the problem of these connectors remains inspection and maintenance of the locking collar. Indeed, the locking collars disclosed in the aforementioned patents are not entirely dismountable. It is therefore not possible to inspect the entire locking collar.

Besides, other "quick" connectors have been described in patent applications FR-3,020,655 (WO-2015/169,560) and FR-3-020,654 (WO-2015/169,559). These connectors are dismountable. However, in order to be able to use them on existing drilling sites, it would be necessary to replace the entire riser, which requires major investments. Furthermore, replacement of the entire riser is not environment friendly.

A riser for other applications, notably production, completion or work-over, is also made up of an assembly of tubular elements assembled by connectors for which the problem of inspection also arises.

In order to overcome these drawbacks, the present invention relates to a method for upgrading a connector of an existing riser by cutting out the male connector element or the locking collar, then by replacing the locking collar with a dismountable locking collar. It is thus possible to form a connector that can be inspected from a non-dismountable connector. Complete control of the connector is thus made possible. Furthermore, the method according to the invention allows an already existing riser to be reused, which allows investments to be limited.

SUMMARY OF THE INVENTION

The invention relates to a method for upgrading a connector assembling two sections of a drilling riser, said connector comprising a first riser section, a second riser section, a non-dismountable locking collar, said first riser section being made up of at least one main tube element extended by said male connector element, said second section being made up of at least one main tube element extended by said female connector element, said male connector element cooperating with said female connector element for assembling said two sections, said locking collar being arranged around said male and female connector elements. For this method, at least the following steps are carried out using a dismountable replacement locking collar, said replacement locking collar comprising a plurality of studs, said studs of said replacement locking collar cooperating with a plurality of studs of the male connector element, or said replacement locking collar consisting of a screwed or threaded assembly of at least two rings:

a) cutting out at least one element among said male connector element and/or said locking collar, so as to separate said male connector element from said locking collar, and b) replacing at least said locking collar with said replacement locking collar.

According to an embodiment of the invention, said male connector element of said connector is further replaced by a replacement male connector element comprising a series of studs on the outer surface thereof.

Advantageously, the following steps are carried out:

i) positioning the replacement male connector element relative to said female connector element, and ii) fastening said replacement male connector element to said main tube element.

Preferably, prior to fastening said replacement male connector element to said main tube, said main tube element is beveled.

According to an implementation of the invention, at least one series of studs is formed on the outer surface of said male connector element.

Advantageously, at least one series of studs is formed by machining a shoulder of said male connector element.

Furthermore, at least one series of studs can be formed by material addition or by adding studs on said male connector element.

According to an embodiment, when said replacement locking collar is made up of an assembly of two rings, the following steps are carried out:

i) contacting a shoulder of a first ring with a shoulder of said male connector element, and ii) assembling said rings by screwing or threading.

According to an embodiment option, the end of said female connector element is machined in order to obtain a plane surface at said end of said female connector element.

According to an embodiment of the invention, said male and female connector elements are provided with guide means for the respective passage of a first and of a second auxiliary pipe element, said first and second auxiliary pipe elements being connected to one another by connection means, and said method comprises a step of dismounting and replacing said connection means of said auxiliary pipes.

Advantageously, a surface treatment is applied onto said male connector element and/or said female connector element and/or said replacement locking collar.

According to a feature, said method comprises an initial step of disassembling at least one equipment of said riser sections, such as a float, an auxiliary pipe, a clamp or a guide plate.

According to an implementation, said method comprises a final step of assembling at least one equipment of said riser sections, such as a float, an auxiliary pipe, a clamp or a guide plate.

BRIEF DESCRIPTION OF THE FIGURES

Other features and advantages of the method according to the invention will be clear from reading the description hereafter of embodiments given by way of non-limitative example, with reference to the accompanying figures wherein.

DETAILED DESCRIPTION OF THE INVENTION

Figure 1:
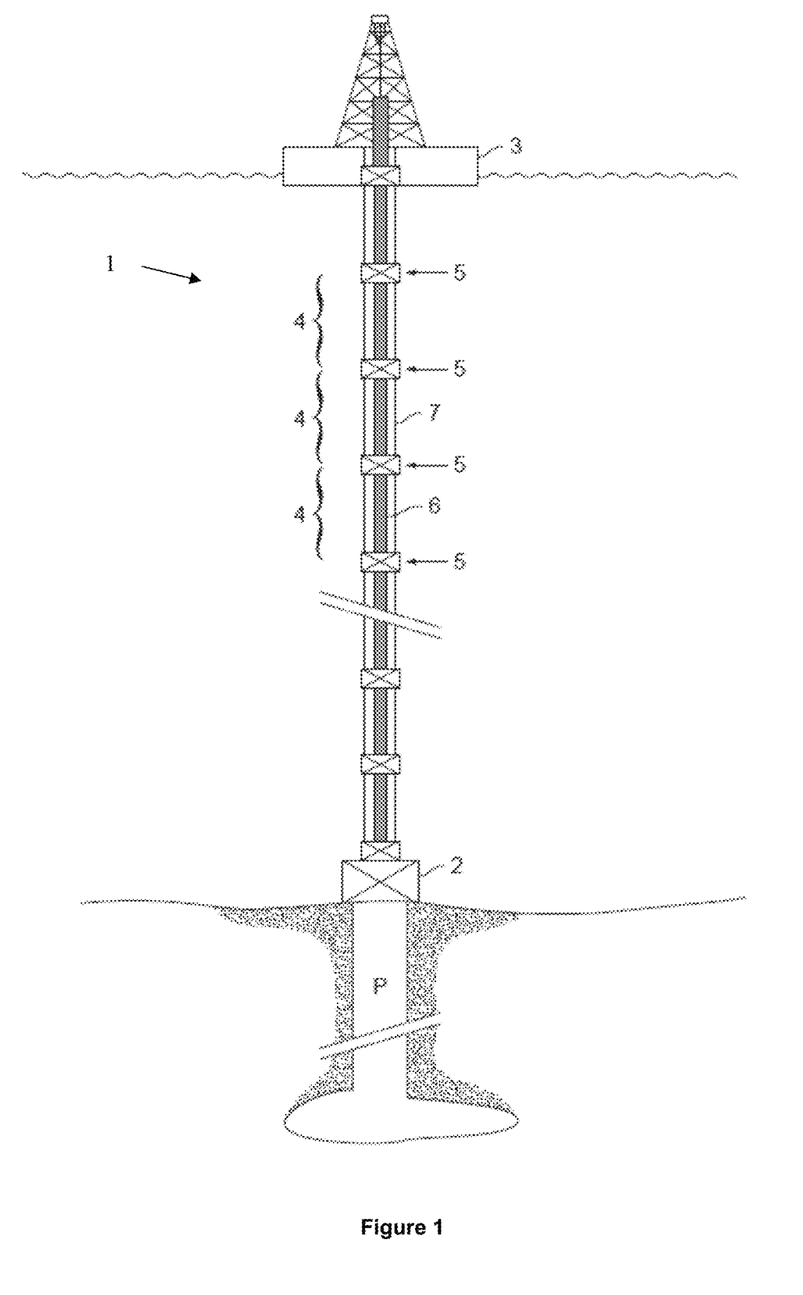
FIG. 1 schematically shows a riser according to the invention.

According to a non-limitative example embodiment, FIG. 1 schematically shows an offshore drilling riser 1. Riser 1 extends well P and it stretches from wellhead 2 to a floater 3, a platform or a vessel for example. Wellhead 2 is provided with a preventer commonly referred to as BOP or Blow-Out Preventer. Riser 1 is made up of an assembly of several sections 4 assembled end to end by connectors 5. Each section consists of a main tube element 6 provided with at least one auxiliary line element 7, also referred to as peripheral line. Auxiliary lines referred to as kill lines or choke lines are used to provide well safety during control procedures relative to the inflow of fluids under pressure in the well. The line referred to as choke line is a safety line carrying fluids (oil, water, gas) coming from the well in the event of an inflow and driving them towards the choke manifold and the flare. The line referred to as kill line is a safety line enabling injection into the well of heavy fluids and cements allowing an otherwise uncontrollable blowout to be stopped. The auxiliary line referred to as booster line allows mud to be injected into the well in order to increase the annulus velocity thereof and to prevent sedimentation of the cuttings; it is also used for replacing the mud contained in the riser with water prior to disconnection. The line referred to as hydraulic line allows the wellhead preventer to be controlled. Hydraulic lines allow the BOP safety devices (valves and accumulators) to be supplied with hydraulic fluid (glycol-laden distilled water) under pressure.

Figure 2:
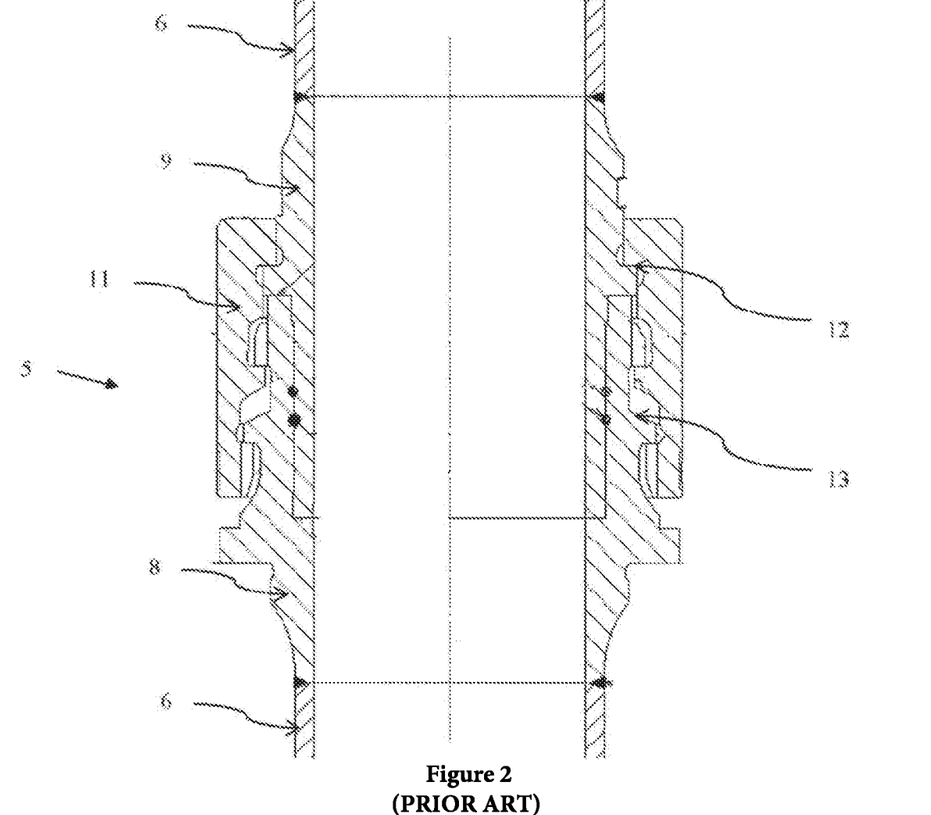
FIG. 2 illustrates a connector according to the prior art.

FIG. 2 schematically shows a connector 5 according to an example of the prior art. In this figure, the possible auxiliary lines are not shown. Connector 5 is made up of two elements designated, with reference to FIG. 2, as female connector element 8 and male connector element 9. Connector elements 8 and 9 are mounted at the ends of main tube element 6. Female connector element 8 is integral with tube 6, for example by welding, by screwing, by crimping or by clamping linkage. Male connector element 9 is integral with tube 6, for example by welding, by screwing, by crimping or by clamping linkage. The male connector element of a section is intended to be inserted into a female connector element of an adjacent section of the riser. For this illustrated prior art example, the assembly of male connector element 9 with a female connector element 8 of another section forms connector 5 that transmits loads from one riser section to the next section, notably the longitudinal loads undergone by the riser. Connector 5 further comprises a locking collar 11 arranged around main tube elements 6. Locking collar 11 enables locking of the male 9 and female 8 connector elements. Locking collar 11 axially abuts against male connector element 9 through the agency of a shoulder 12. Furthermore, the inner surface of the locking collar comprises a series of studs (in the case illustrated, the series comprises two rows) cooperating with a series (of two rows) of studs 13 arranged on the outer surface of female connector element 8. The series of studs of locking collar 11 and of female connector element 8 make up a dismountable assembly referred to as "bayonet" assembly. On the other hand, the assembly of locking collar 11 with male connector element 9 may not be dismountable, due to shoulder 12, notably if male connector element 9 is welded to main tube 6. This non-dismountable feature does not enable complete inspection of locking collar 11 or of male connector element 9 during the maintenance of connector 5.

The purpose of the present invention is to make an existing connector inspectable (i.e. capable of being inspected). Therefore, the present invention relates to a method for upgrading a connector for assembling two riser sections. The initial connector can be such as that described in connection with FIG. 2. However, the method according to the invention is suited to any connector with an external locking collar. The method according to the invention provides replacement of a non-dismountable locking collar with a dismountable replacement locking collar by means of the following steps:

cutting out from the existing connector the male connector element and/or the locking collar so as to separate the male connector element from the locking collar; this step causes destruction of the cut-out part, within the connector, replacing at least the locking collar with a replacement locking collar, the replacement locking collar comprising a series of studs adapted to cooperate with a series of studs of the male connector element, or the replacement locking collar consisting of a screwed or threaded assembly of two rings.

Advantageously, the steps of the method according to the invention are carried out at the surface and not at sea.

According to an implementation of the invention, cutting out the existing connector can be performed using an extra-thick orbital cutting tool, such as that marketed by the COFIM Company. This implementation is not limitative, and cutting can be achieved using any similar means.

For the embodiment where the locking collar comprises a series of studs cooperating with a series of studs of the male connector element, the dismountable feature is provided by the "bayonet" connection formed by these series of studs. Thus, the locking collar can be dismounted through a combination of rotational and translational motions of the locking collar relative to the male connector element. The locking collar and the male connector element can thus be completely inspected.

For this embodiment, the male connector element can be adapted to the locking collar, either by replacing the male connector element or by modifying the male connector element.

According to a first implementation of this embodiment, replacement of the male connector element can be achieved by carrying out the following steps:

cutting out the male connector element from the main tube, positioning the replacement male connector element relative to the female connector element in such a way that the series of studs of the two "bayonet" connections are in line with the series of studs of the locking collar, and fastening the replacement male connector element to the main tube, for example by welding, crimping, screwing at the location where the initial male connector element has been cut out.

This implementation can comprise an optional step of beveling the end of the main tube, this step being carried out prior to the step of fastening the replacement male connector element. This bevel allows to facilitate the step of welding the replacement male connector element onto the main tube.

According to a second implementation of this embodiment, modifying the male connector element can consist in forming at least one series of studs on the outer surface of the male connector element.

According to an embodiment option, at least one series of studs can be formed by machining a shoulder of the male connector element.

Alternatively or furthermore, at least one series of studs can be formed by material addition or by adding studs.

For the embodiment where the locking collar consists of two rings assembled by screwing or threading, the dismountable feature is provided by screwing or threading the two rings to one another. Thus, the two rings can be separated and inspected. In this case, a first ring can act as a stop with the male connector element and the second ring can act as a connection with the female connector element, the second ring comprising a series of studs adapted to cooperate with the series of studs of the female connector element.

For this embodiment, the male connector element does not need to be replaced or modified.

For this embodiment, the following steps can be carried out:

contacting a shoulder of a first ring with a shoulder of the male connector element, assembling the two rings by screwing or threading.

After carrying out the steps of the method according to the invention, a connector suited to a drilling riser as described in connection with FIG. 1 for example is obtained, but the connector according to the invention can also be suited to a completion, work-over or production riser, which has the particular feature of having no auxiliary line.

According to the invention, the modified connector comprises:

a first main tube element extended by a male connector element, optionally provided with guide means (a male flange or a guide plate for example) for passage of an auxiliary pipe element (in cases where the riser comprises at least one auxiliary line), a second main tube element extended by a female connector element, optionally provided with guide means (a female flange or a guide plate for example) for passage of an auxiliary pipe element (in cases where the riser comprises at least one auxiliary line), the male connector element fitting into the female connector element for connecting the main tube elements and the auxiliary pipe elements, optionally, a first auxiliary pipe element passing through the guide means of the male connector element, optionally, a second auxiliary pipe element passing through the guide means of the female connector element, and assembly locking means comprising a locking collar arranged outside the male and female connector elements, referred to as external locking collar, the locking collar being:

either a locking collar comprising, on the inner face thereof, a first series and a second series of studs adapted to cooperate with a third series and a fourth series of studs arranged on inner surfaces of the male and female connector elements respectively, or a locking collar made up of two rings assembled by screwing or threading.

Preferably, the replacement locking collar can be manufactured as a single piece.

Besides, the locking means can comprise dismountable pins arranged in the locking collar and cooperating with the male connector element so as to translationally lock the locking collar.

The connector can be designed and dimensioned so as to meet the specifications mentioned by the API 16 R and API 2 RD standards edited by the American Petroleum Institute.

Figure 3:
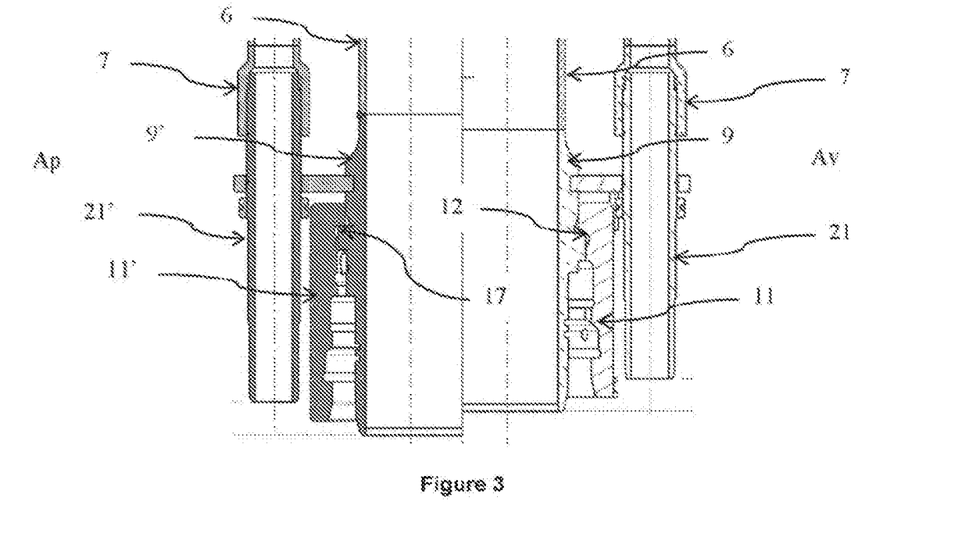
FIG. 3 illustrates a connector that can be obtained according to an embodiment of the invention.

FIG. 3 illustrates a connector that can be obtained with an embodiment of the method according to the invention. In this figure, the female connector element is not shown. The right-hand part (Av) illustrates the initial connector (prior to the steps of the method according to the invention) according to an example, and the left-hand part (Ap) illustrates the connector obtained after the steps of the method according to an embodiment.

The initial connector (Av) is substantially identical to the one illustrated in FIG. 2. The connector comprises a male connector element 9 fastened to an end of main tube 6. The connector also comprises a locking collar 11. Locking collar 11 abuts against a shoulder 12 of male connector element 9. On the other side, locking collar 11 comprises at least one series of studs for forming a bayonet connection with the female connector element. Male connector element 9 further comprises guide means for passage of an auxiliary pipe element 7. A stab 21 is inserted in the end of auxiliary pipe element 7. The other end of stab 21 is intended to be inserted in the end of the auxiliary pipe element passing through the guide means (not shown) of the female connector element. Stab 21 enables connection between two consecutive auxiliary pipe elements.

The modified connector (Ap) comprises a replacement male connector element 9' fastened to an end of main tube 6. Replacement male connector element 9' comprises at least one series of studs 17 on the outer surface thereof. The connector also comprises a replacement locking collar 11'. Replacement locking collar 11' comprises at least one series of studs on the inner surface thereof, this series of studs being adapted to cooperate with series of studs 17 of replacement male connector element 9'. Thus, a bayonet connection is provided between replacement locking collar 11' and replacement male connector element 9'. On the other side, replacement locking collar 11' comprises at least one series of studs for forming a bayonet connection with the female connector element. Replacement male connector element 9' further comprises guide means for passage of an auxiliary pipe element 7. A replacement stab 21' is inserted in the end of auxiliary pipe element 7. The other end of replacement stab 21' is intended to be inserted in the end of the auxiliary pipe element passing through the guide means (not shown) of the female connector element. Replacement stab 21' allows connection between two consecutive auxiliary pipe elements. As illustrated in FIG. 3, replacement male connector element 9' can be longer than initial male connector element 9 (in order to achieve a series of studs on the male connector element of dimensions similar to those of the studs of the female connector element). In this case, replacement stab 21' can be longer than initial stab 21.

Figure 4:
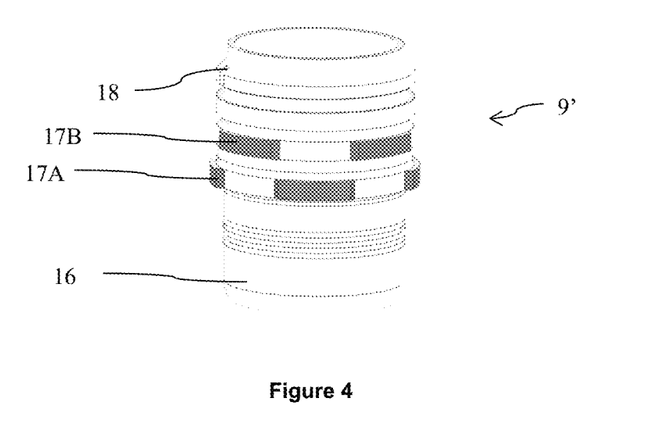
FIG. 4 illustrates a male connector element that can be used for an embodiment of the invention.

FIG. 4 illustrates an example of a replacement male connector element 9' that can be used for an embodiment of the invention (the embodiment of FIG. 3 for example) where the male connector element is replaced. Replacement male connector element 9' is a substantially cylindrical part comprising a first end 18 intended to be fastened to a main tube element. Furthermore, replacement male connector element 9' comprises a second end 16 intended to be inserted in the female connector element. Replacement male connector element 9' comprises, on the outer face thereof, a series of studs consisting of two rows of studs 17A and 17B. Row 17A is the centremost row of the connector. According to the embodiment illustrated, each row of studs 17A, 17B comprises four studs having an angular range of 45°. The two rows of studs 17A, 17B are inscribed in different diameters. Thus, insertion and locking in the locking collar (and, reversely, unlocking and withdrawal) is enabled by a single translation. Besides, the circumferential distributions of the studs of rows 17A, 17B are alternated: the studs of row 17A face (are in line with) the intervals between two studs of row 17B, and vice versa.

Figure 5:
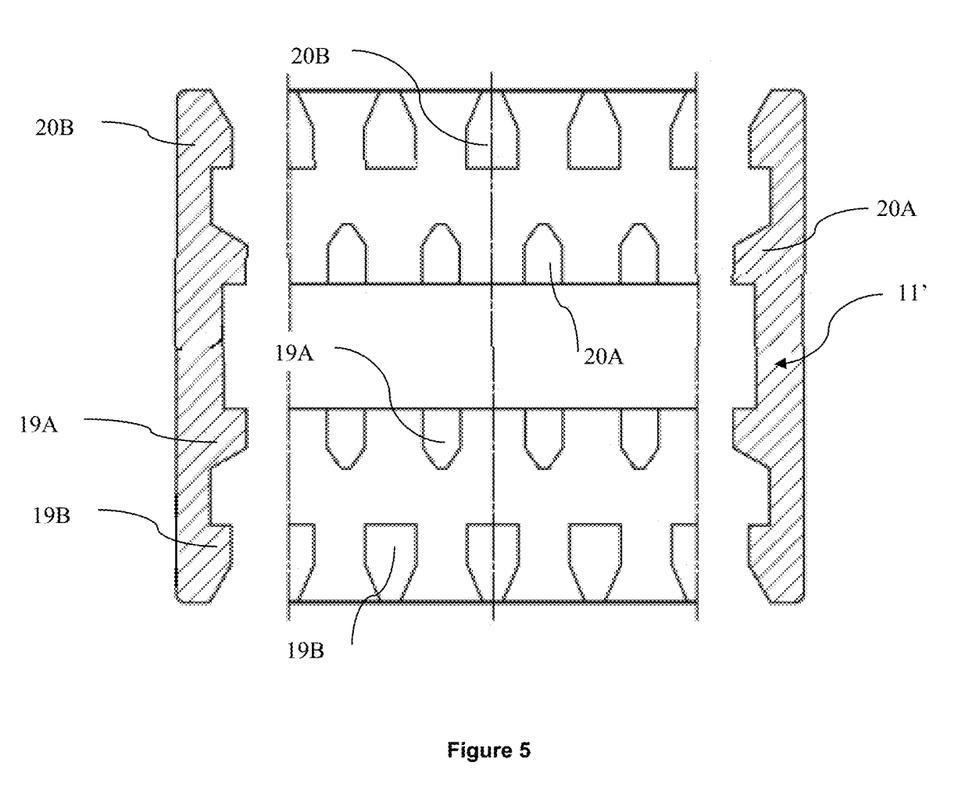
FIG. 5 illustrates a cross-sectional view of a locking collar that can be used for an embodiment of the invention.

FIG. 5 illustrates, by way non-limitative example, a replacement locking collar 11' for an embodiment of the invention (the embodiment of FIG. 3 for example). FIG. 5 is a cross-sectional view of the locking collar. Replacement locking collar 11' is a substantially cylindrical part. Replacement locking collar 11' comprises, on the inner surface thereof, a first series of studs 19 and a second series of studs 20. First series of studs 19 is adapted to cooperate with the series of studs of the replacement male connector element. Second series of studs 20 is adapted to cooperate with the series of studs of the female connector element. According to the embodiment illustrated, each series of studs 19, 20 comprises two rows of studs 19A, 19B and 20A, 20B. Rows 19A and 20A are the centremost rows of studs. Each row of studs comprises four studs having an angular range of 45°. In the example illustrated, the studs of the central rows of studs 19A, 20A are inscribed in diameters smaller than the diameters of the outer rows of studs 19B, 20B. Furthermore, the circumferential distributions of the studs of rows 19A, 19B are alternated: the studs of row 19A face (are in line with) the intervals between two studs of row 19B, and vice versa. Similarly, the circumferential distributions of the studs of rows 20A, 20B are alternated: the studs of row 20A face (are in line with) the intervals between two studs of row 20B, and vice versa. Besides, for the embodiment illustrated, the circumferential distributions of the studs of the first and third series are symmetrical relative to a radial plane extending between the first and third series of studs: the studs of row 19A face (are in line with) the studs of row 20A, and the studs of row 19B face (are in line with) the studs of row 20B.

The various embodiments described above and hereafter can be combined so as to combine the effects thereof.

Preferably, prior to the steps of the method according to the invention, the female connector element is disconnected from the locking collar. Thus, each riser section can be modified independently of the other sections.

Besides, after the steps of the method according to the invention, the riser sections can be connected to each other by means of replacement locking collars.

Furthermore, the riser sections modified by the method according to the invention can also be connected to sections according to the prior art. For example, a section with a modified male connector element and locking collar can be connected to a section according to the prior art with a female element according to the prior art.

For the method according to the invention, the female connector element is not structurally modified. Thus, the connector modification cost and time can be limited.

However, according to an implementation of the invention, the method of the invention can comprise a step of slightly modifying the female connector element, which can consist in a stage of machining the end of the female connector element so as to obtain a plane surface at the end of the female connector element. Indeed, the end of the female connector element can be inclined, which limits the contact surface between the parts of the connector and may be limiting for load transmission. This machining step can be performed with dedicated tools that can be positioned on a reference surface of the female element, for example a shoulder of the female connector element. These dedicated tools can include an offset milling cutter whose tool travel can be controlled to provide good coaxiality. Alternatively, this machining step can be carried out using an extra-thick orbital cutting tool, such as for example the tool marketed by the COFIM Company (France).

According to an embodiment option of the invention, when the riser comprises auxiliary lines, the auxiliary line elements being connected by connection means, the method according to the invention can comprise a step of replacing the connection means of the auxiliary lines. This step allows to adapt the length of the connection means of the auxiliary lines to the length of the male connector element. Indeed, the replacement male connector element can be longer than the initial male connector element.

For example, the connection means of the auxiliary lines can comprise a stab that enters the ends of the auxiliary line elements to provide connection thereof. In this case, replacing the connection means can consist in replacing the stab. The replacement stab can be longer than the initial stab of the connection means so as to adapt to the length of the replacement male connector element.

Advantageously, to favour sliding of the parts in relation to each other and to prevent corrosion, in particular for the studs, a surface treatment can be applied, for example an anti-corrosion treatment or a sliding surface coating on the replacement male connector element and/or female connector element and/or locking collar.

According to an example embodiment, application of an anti-corrosion protective treatment of phosphate coating type can consist in dipping the part in a hot zinc phosphate bath for example. Furthermore, solid lubricant coatings based on molybdenum disulfide can be used to favour sliding between two contact surfaces. This coating consists in applying two hot-polymerized polymer layers of Molykote®/Xylan®/Everslik® type.

A riser is generally provided with equipments such as floats, auxiliary lines, clamps, guide plates. These equipments are generally independent of the connector.

In this case, the method according to the invention can comprise an initial step (i.e. prior to the cutting step) of disassembling these equipments. It is thus easier to handle the riser sections and to carry out the cutting and locking collar replacement steps. Preferably, disassembling is achieved in this order: the floats, the clamps, the auxiliary lines and the guide plates.

Besides, the method according to the invention can comprise a final step (i.e. after the locking collar replacement step) of assembling these equipments. Preferably, assembling is achieved in this order: the guide plates, the auxiliary lines, the clamps and the floats.

Preferably, the riser equipments are not modified by the method according to the invention. Thus, modification of the connector concerns at most: the male connector element, the female connector element and the locking collar, which limits the connector modification cost and time, and allows a maximum amount of riser elements to be reused.

Advantageously, each series of studs can comprise one or more rows of studs, preferably one, two or three rows of studs.

Each row of studs can advantageously comprise a plurality of studs evenly distributed over the circumference of the locking collar or of the male or female connector element. According to implementation examples, each row of studs can comprise between 3 and 8 studs, 4 or 6 for example.

In the rest of the description hereafter, several embodiments of the method are presented in a non-limitative manner. These embodiments combine the various steps presented above.

First Embodiment

For this first embodiment, the locking collar, the male connector element and the connection means of the auxiliary lines are replaced, and the female connector element is modified.

This embodiment has the advantage of providing the most robust connector in terms of load transmission because the studs of the male connector element can be substantially identical to the studs of the female connector element.

For this embodiment, the following steps can be carried out:

disassembling the equipments provided on the riser, such as floats, peripheral lines, clamps and guide plates: at the end of this step, the riser section only comprises the main tube, the male and female connector elements and the locking collar mounted on the male connector element, cutting out the male connector element: at the end of this step, the riser section only comprises the main tube and the female connector element, creating a bevel at the end of the main tube to prepare welding of the replacement male connector element, positioning (according to the position of the female connector element) and fastening, by welding, the replacement male connector element onto the end of the main tube; the replacement male connector element comprises at least one series of studs on the outer surface thereof: at the end of this step, the section comprises the main tube, the female connector element and the replacement male connector element, machining the end of the female connector element in order to obtain a plane surface at the end of the female connector element, applying a surface treatment to the female connector element, for example an anti-corrosion treatment and a sliding surface coating, assembling the guide plates on the male and female connector elements, positioning the replacement locking collar on the replacement male connector element; the replacement locking collar comprises at least one series of studs on the inner surface thereof, which cooperates with the series of studs of the replacement male connector element; at the end of this step, the section comprises the main tube, the machined female connector element, the replacement male connector element, the guide plates and the replacement locking collar, assembling the peripheral lines with the replacement stabs using notably the guide plates, and assembling the clamps and the floats around the main tube and the peripheral lines: at the end of this step, the modified riser section is complete and can be connected to another riser section by means of the replacement locking collar.

Thus, the replacement locking collar being dismountable by two bayonet connections, complete inspection of the connector is made possible. Indeed, it is possible to inspect the locking collar and the male and female connector elements.

FIGS. 6(a) to (i) schematically illustrate, by way of non-limitative example, the result of each step of this first embodiment for a riser section.

Figure 6:
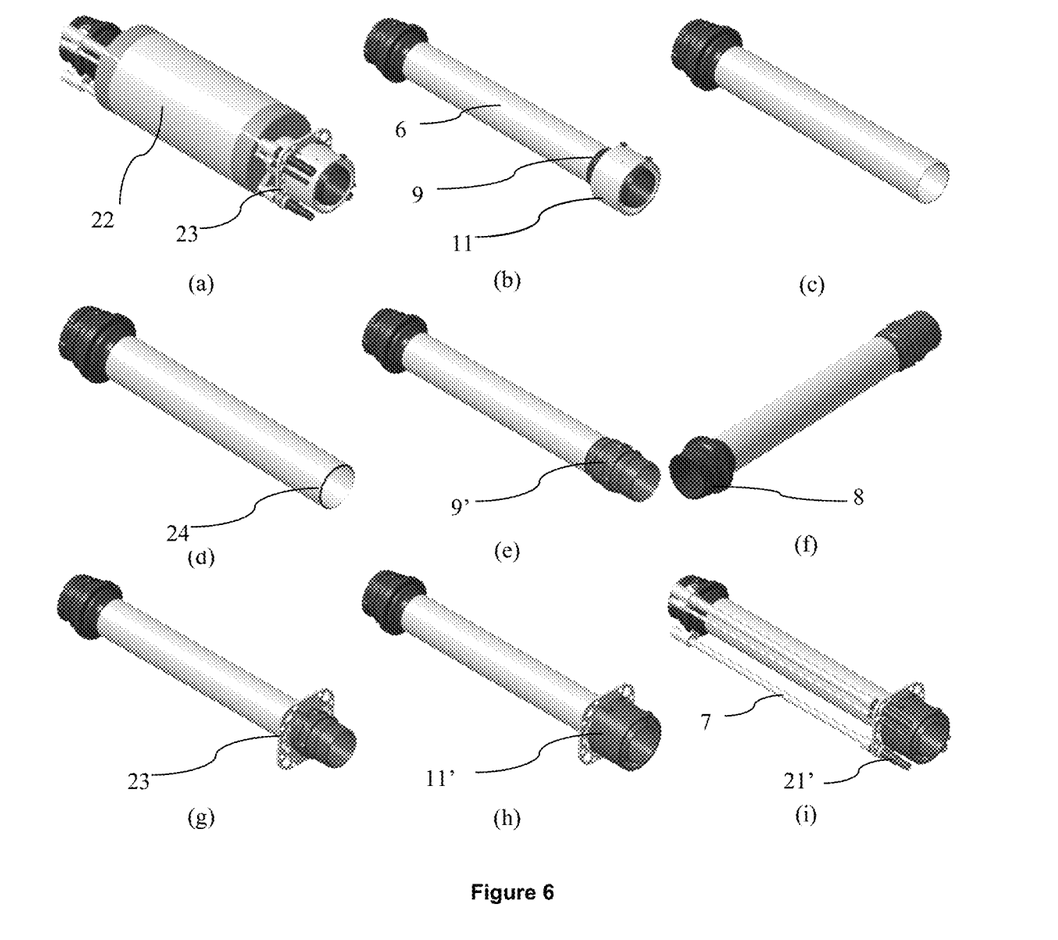
FIG. 6 illustrates the steps of the method according to an embodiment of the invention.

Figure (a) illustrates the section prior to modification, with notably the connector, float 22, the peripheral lines and guide plates 23.

Figure (b) illustrates the section without these equipments (float, peripheral lines, guide plates). The section then comprises main tube 6, the female connector element, male connector element 9 and locking collar 11.

Figure (c) illustrates the section after the male connector element has been cut out. The section then comprises the main tube and the female connector element.

Figure (d) illustrates the section after bevel 24 was made at the end of the main tube.

Figure (e) illustrates the section after positioning and welding replacement male connector element 9' at the end of the main tube. For this embodiment, replacement male connector element 9' comprises two rows of studs on the outer face thereof.

Figure (f) illustrates the section after machining female connector element 8 in order to obtain a plane surface for the end of female connector element 8.

Figure (g) illustrates the section after assembling guide plate 23.

Figure (h) illustrates the section after assembling replacement locking collar 11' on replacement male connector element 9'.

Figure (i) illustrates the section after assembling peripheral lines 7 with replacement stab 21'.

Second Embodiment

For this second embodiment, the locking collar, the male connector element and the connection means of the auxiliary lines are replaced. In relation to the first embodiment, the step of machining the end of the female connector element is not carried out for the purpose of simplifying operations, or for cases where the female connector element already has a plane surface at its end.

For this embodiment, rotation of the replacement locking collar can occur on an inclined surface of the female upper part.

For this embodiment, the following steps can be carried out:
   disassembling the equipments provided on the riser, such as floats, peripheral lines, clamps and guide plates: at the end of this step, the riser section only comprises the main tube, the male and female connector elements and the locking collar mounted on the male connector element,
   cutting out the male connector element: at the end of this step, the riser section only comprises the main tube and the female connector element,
   creating a bevel at the end of the main tube to prepare welding of the replacement male connector element,
   positioning (according to the position of the female connector element) and fastening, by welding, the replacement male connector element onto the end of the main tube; the replacement male connector element comprises at least one series of studs on the outer surface thereof: at the end of this step, the section comprises the main tube, the female connector element and the replacement male connector element,
   assembling the guide plates on the male and female connector elements,
   positioning the replacement locking collar on the replacement male connector element; the replacement locking collar comprises at least one series of studs on the inner surface thereof, which cooperates with the series of studs of the replacement male connector element; at the end of this step, the section comprises the main tube, the female connector element, the replacement male connector element, the guide plates and the replacement locking collar,
   assembling the peripheral lines with the replacement stabs using notably the guide plates, and
   assembling the clamps and the floats around the main tube and the peripheral lines: at the end of this step, the modified riser section is complete and can be connected to another riser section by means of the replacement locking collar.

Thus, the replacement locking collar being dismountable by two bayonet connections, complete inspection of the connector is made possible. Indeed, it is possible to inspect the locking collar and the male and female connector elements.

The steps of this embodiment correspond to the steps illustrated in FIGS. 6 (*a*) to (*e*) and (*g*) to (*i*).

Third Embodiment

For this third embodiment, the locking collar and the male connector element are replaced. In relation to the first embodiment, the step of machining the end of the female connector element is not carried out for the purpose of simplifying operations, or for cases where the female connector element already has a plane surface at its end. Besides, in relation to the first embodiment, the stab of the peripheral line connection means is not replaced.

For this embodiment, rotation of the replacement locking collar can occur on an inclined surface of the female upper part.

Furthermore, in order not to modify the length of the replacement male connector element in relation to the initial male connector element, the axial length (along the axis of the riser) of the series of studs of the replacement male connector element is reduced in relation to the axial length of the studs of the female connector element. Thus, the overall dimension of the series of studs is similar to the overall dimension of the shoulders of the initial male connector element. It is therefore not necessary to replace the stabs of the auxiliary lines.

The third embodiment thus has the advantage of limiting the number of parts to be replaced.

For this embodiment, the following steps can be carried out:
   disassembling the equipments provided on the riser, such as floats, peripheral lines, clamps and guide plates: at the end of this step, the riser section only comprises the main tube, the male and female connector elements and the locking collar mounted on the male connector element,
   cutting out the male connector element: at the end of this step, the riser section only comprises the main tube and the female connector element,
   creating a bevel at the end of the main tube to prepare welding of the replacement male connector element,
   positioning (according to the position of the female connector element) and fastening, by welding, the replacement male connector element onto the end of the main tube; the replacement male connector element comprises at least one series of studs on the outer surface thereof: at the end of this step, the section comprises the main tube, the female connector element and the replacement male connector element,
   assembling the guide plates on the male and female connector elements,
   positioning the replacement locking collar on the replacement male connector element; the replacement locking collar comprises at least one series of studs on the inner surface thereof, which cooperates with the series of studs of the replacement male connector element; at the end of this step, the section comprises the main tube, the female connector element, the replacement male connector element, the guide plates and the replacement locking collar,
   assembling the peripheral lines with the initial stabs using notably the guide plates, and
   assembling the clamps and the floats around the main tube and the peripheral lines: at the end of this step, the modified riser section is complete and can be connected to another riser section by means of the replacement locking collar.

Furthermore, the replacement locking collar being dismountable by two bayonet connections, complete inspection of the connector is made possible. Indeed, it is possible to inspect the locking collar and the male and female connector elements.

The steps of this embodiment correspond to the steps illustrated in FIGS. 6 (*a*) to (*e*) and (*g*) to (*i*), with the difference that, for step (i), the initial stabs of the peripheral lines are used.

Figure 7:
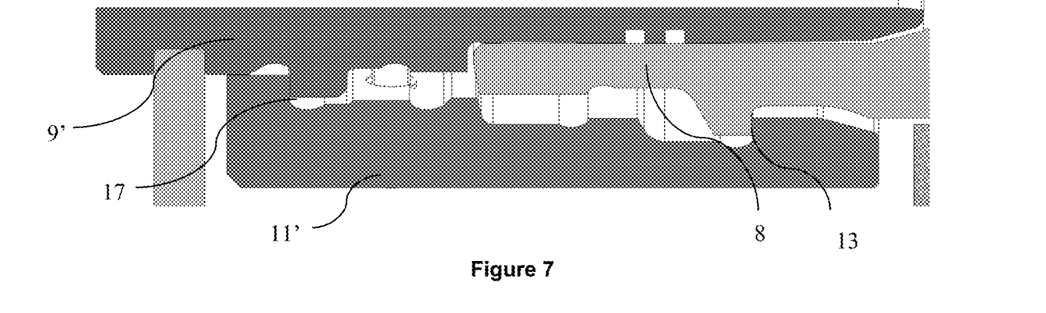
FIGS. 7 to 10 illustrate connectors that can be obtained with various embodiments of the invention.

FIG. 7 schematically illustrates, by way of non-limitative example, a connector obtained with the method according to the third embodiment. FIG. 7 is a half sectional view of a connector according to this embodiment. The connector comprises a replacement locking collar 11' provided with a series of studs adapted to cooperate with a series of studs 13 of female connector element 8 and a series of studs adapted to cooperate with a series of studs 17 of replacement male connector element 9'. The axial length of the series of studs 17 of replacement male connector element 9' is shorter than the length of studs 13 of female connector element 8, so as to have an overall dimension similar to the shoulder of the initial locking collar.

Fourth Embodiment

For this fourth embodiment, only the locking collar is replaced and the initial male connector element is modified. Modifying the male connector element consists in forming at least one series of studs in place of the existing shoulder. The series of studs can be formed by machining the shoulder, by adding material and/or by adding studs.

The series of studs of the modified male connector element can comprise one or two series of studs.

This embodiment has the advantage of requiring a single new part: the replacement locking collar.

For this embodiment, the following steps can be carried out:
  disassembling the equipments provided on the riser, such as floats, peripheral lines, clamps and guide plates: at the end of this step, the riser section only comprises the main tube, the male and female connector elements and the locking collar mounted on the male connector element,
  cutting out the male connector element: at the end of this step, the riser section comprises the main tube and the male and female connector elements,
  forming at least one series of studs on the outer surface of the male connector element, by machining and/or material addition for example,
  applying a surface treatment to the modified male connector element, for example an anti-corrosion treatment and a sliding surface coating,
  assembling the guide plates on the male and female connector elements,
  positioning the replacement locking collar on the replacement male connector element; the replacement locking collar comprises at least one series of studs on the inner surface thereof, which cooperates with the series of studs of the modified male connector element; at the end of this step, the section comprises the main tube, the female connector element, the replacement male connector element, the guide plates and the replacement locking collar,
  assembling the peripheral lines with the replacement stabs using notably the guide plates, and
  assembling the clamps and the floats around the main tube and the peripheral lines: at the end of this step, the modified riser section is complete and can be connected to another riser section by means of the replacement locking collar.

Thus, the replacement locking collar being dismountable by two bayonet connections, complete inspection of the connector is made possible. Indeed, it is possible to inspect the locking collar and the male and female connector elements.

Figure 8:
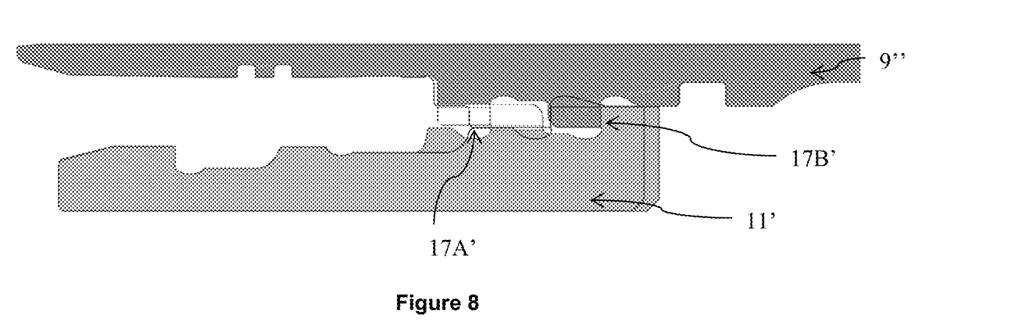

FIG. 8 schematically illustrates, by way of non-limitative example, a connector obtained with the method according to the fourth embodiment. FIG. 8 is a half sectional view of a connector according to this embodiment, the female connector element is not shown. Modified male connector element 9''' comprises two rows of studs 17A' and 17B'. In this figure, a row of studs 17B' formed by machining is illustrated in a shade of grey and a row of studs 17A' formed by material addition is shown in white. The connector comprises a replacement locking collar 11' provided with a series of studs adapted to cooperate with a series of studs of the female connector element, and a series of studs (comprising two rows of studs) adapted to cooperate with a series of studs 17A' and 17B' of modified male connector element 9'''.

Fifth Embodiment

For this fifth embodiment, only the locking collar is replaced. The replacement locking collar then consists of two rings assembled by threading or screwing. Once assembled, the outer and inner shape of the replacement locking collar is similar to that of the initial locking collar: it comprises on the one hand a series of studs adapted to cooperate with a series of studs of the female connector element and, on the other hand, a shoulder adapted to abut against a shoulder of the male connector element.

According to a design of this fifth embodiment, one of the two rings of the locking collar can be made up of two parts, two half shells for example.

This embodiment has the advantage of requiring only replacement of the locking collar, without modifying the other parts of the connector.

For this embodiment, the following steps can be carried out:
  disassembling the equipments provided on the riser, such as floats, peripheral lines, clamps and guide plates: at the end of this step, the riser section only comprises the main tube, the male and female connector elements and the locking collar mounted on the male connector element,
  cutting out the locking collar: at the end of this step, the riser section comprises the main tube and the male and female connector elements,
  assembling the guide plates on the male and female connector elements,
  positioning a first ring of the replacement locking collar so that it abuts against the shoulder of the male connector element (the first ring can consist of two half shells assembled by screwing or snap-fitting) and assembling the two rings by screwing or threading; the second ring of the replacement locking collar comprises at least one series of studs on the inner surface thereof, which cooperates with the series of studs of the female connector element; at the end of this step, the section comprises the main tube, the female connector element, the replacement male connector element, the guide plates and the replacement locking collar, assembling the peripheral lines with the replacement stabs using notably the guide plates, and assembling the clamps and the floats around the main tube and the peripheral lines: at the end of this step, the modified riser section is complete and can be connected to another riser section by means of the replacement locking collar.

Thus, the replacement locking collar being dismountable through the assembly of the two rings, complete inspection of the connector is made possible. Indeed, it is possible to inspect the locking collar and the male and female connector elements.

Figure 9:
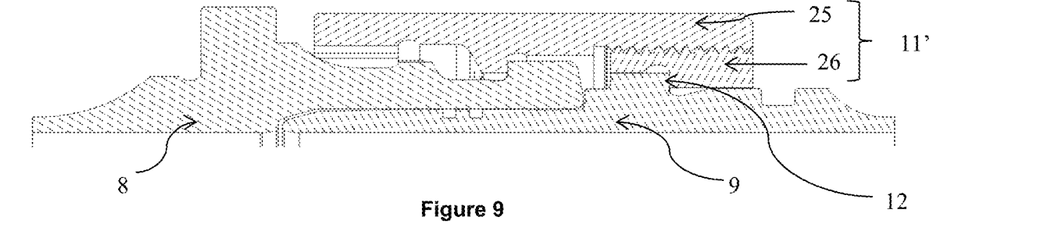

FIG. 9 schematically illustrates, by way of non-limitative example, a first variant of a connector obtained with the method according to the fifth embodiment. FIG. 9 is a half sectional view of a connector according to this embodiment. Initial male connector element 9 comprises a shoulder 12. Replacement locking collar 11' comprises a first ring 26. First ring 26 comprises a shoulder abutting against shoulder 12 of male connector element 9. First ring 26 comprises a threaded outer surface onto which second ring 25 of replacement locking collar 11' is fastened. The inside diameter of first ring 26 is smaller than the inside diameter of second ring 25.

Figure 10:
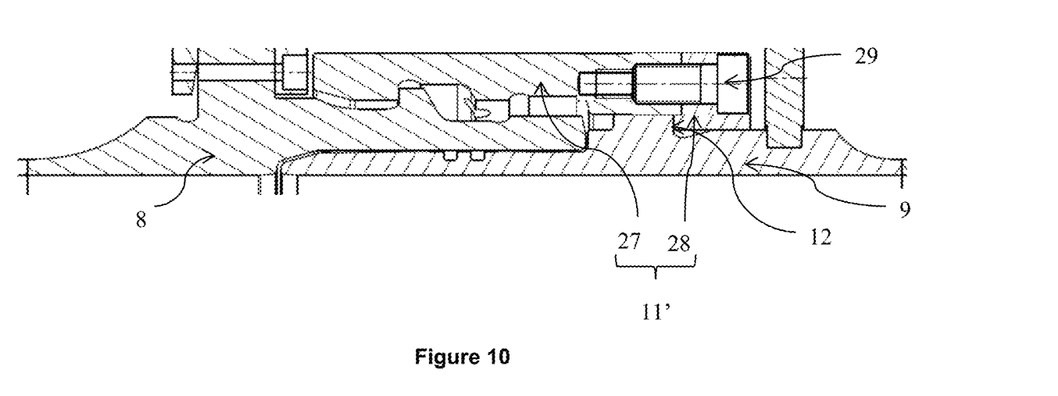

FIG. 10 schematically illustrates, by way of non-limitative example, a second variant of a connector obtained with the method according to the fifth embodiment.

FIG. 10 is a half sectional view of a connector according to this embodiment. Initial male connector element 9 comprises a shoulder 12. Replacement locking collar 11' comprises a first ring 28. First ring 28 abuts against shoulder 12 of male connector element 9. Replacement locking collar 11' comprises a second ring 27 resting on first ring 28. The inside diameter of first ring 28 is smaller than the inside diameter of second ring 27. The two rings 27 and 28 are assembled by screws whose direction is parallel to the axis of the riser.

The invention claimed is:

1. A method for upgrading a connector assembly of a first riser section and a second riser section of a drilling riser including a non-dismountable locking collar, the first riser section including at least one main tube element extended by a male connector element, the second riser section including at least one main tube element extended by the female connector element, the male connector element cooperating with the female connector element for assembling the first and second riser sections, the locking collar having a dismountable replacement locking collar disposed around the male and female connector elements, the dismountable replacement locking collar comprising a plurality of studs, the studs of the replacement locking collar cooperating with a plurality of studs of the male connector element or the replacement locking collar including an assembly including screws or threads having at least two rings comprising:

a) cutting out at least one element among at least one of the male connector element and the locking collar to separate the male connector element from the locking collar; and b) replacing at least the locking collar with the replacement locking collar.

2. A method as claimed in claim 1, comprising:
replacing the male connector element of the connector with a replacement male connector element comprising a series of studs on an outer surface thereof.

3. A method as claimed in claim 2, comprising:
i) positioning the replacement male connector element relative to the female connector element; and
ii) fastening the replacement male connector element to a tube element.

4. A method as claimed in claim 3 comprising:
beveling the tube element prior to fastening the replacement male connector element to the main tube element.

5. A method as claimed in claim 1, comprising:
forming at least one series of studs on an outer surface of the male connector element.

6. A method as claimed in claim 5, comprising:
machining a shoulder on the connector element to form at least one series of studs.

7. A method as claimed in claim 6, comprising:
forming at least one series of studs by at least one of material addition or adding studs to the male connector element.

8. A method as claimed in claim 5, comprising:
forming at least one series of studs by at least one of material addition or adding studs to the male connector element.

9. A method as claimed in claim 1 of configuring the replacement locking collar into an assembly of rings comprising:
i) contacting a shoulder of the male connector element having the rings; and
ii) assembling the rings by screwing or threading.

10. A method as claimed in claim 1, comprising:
machining an end of the female connector element to form a plane surface at an end of the female connector element.

11. A method as claimed in claim 1, comprising:
providing the male and female connector elements with a guide providing passage of first and second auxiliary pipe elements connected to one another by a connector; and
dismounting and replacing the connector of the auxiliary pipe element.

12. A method as claimed in claim 1, comprising:
applying a surface treatment to at least one of the male connector element and the female connector element and the replacement locking collar.

13. A method as claimed in claim 1, comprising:
disassembling at least one equipment of the riser sections, before replacement with the at least one equipment being a float, an auxiliary pipe, a clamp or a guide plate.

14. A method as claimed in claim 1, comprising:
assembling at least one equipment of the riser sections as a final step with the at least one equipment being a float, an auxiliary pipe, a clamp or a guide plate.

* * * * *